Jan. 26, 1926.  1,570,619
E. C. CROMPTON
VEHICLE LAMP CONTROL
Filed Dec. 29, 1923  2 Sheets-Sheet 1
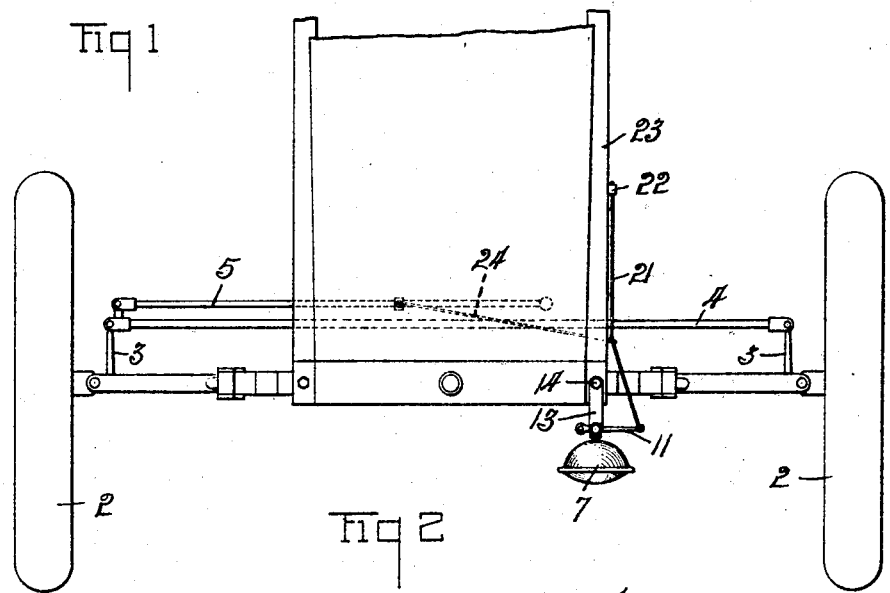
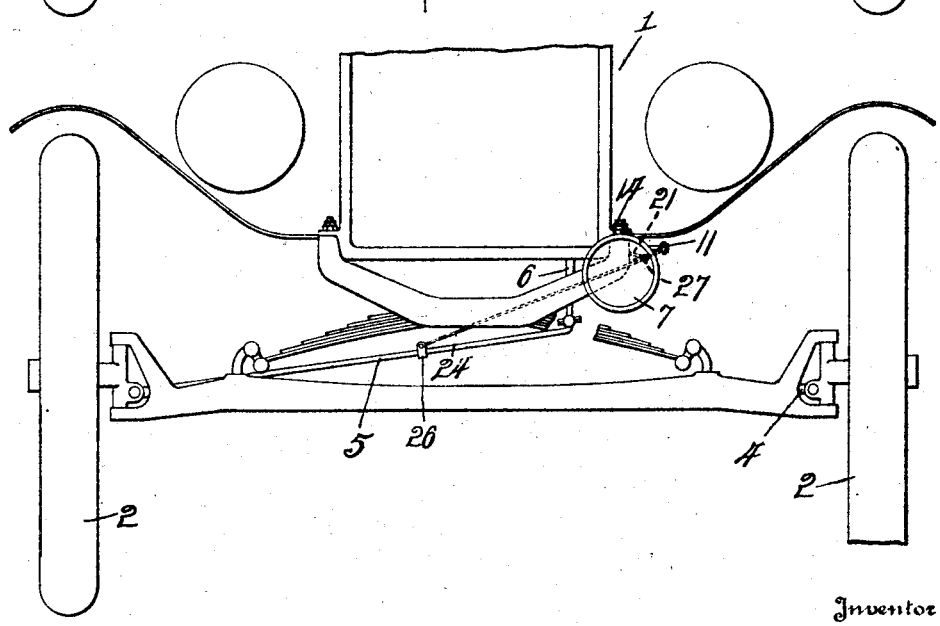
Inventor
Edwin C. Crompton,
By Owen Owen & Crompton,
Attorneys.

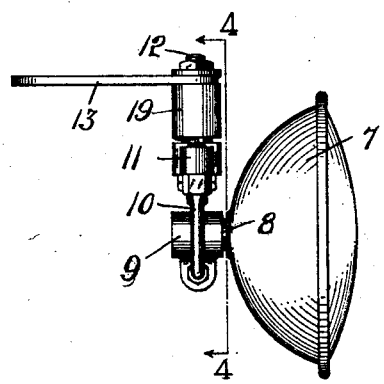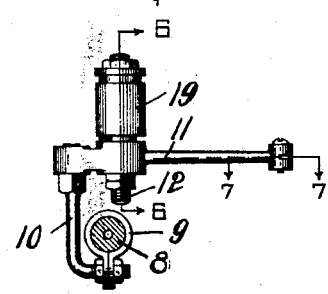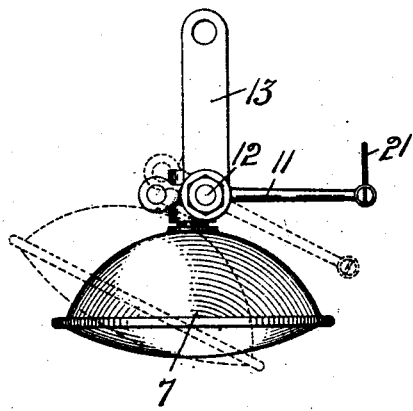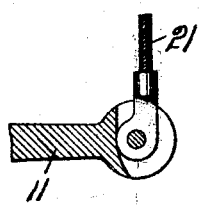

Patented Jan. 26, 1926.

1,570,619

UNITED STATES PATENT OFFICE.

EDWIN C. CROMPTON, OF TOLEDO, OHIO, ASSIGNOR TO THE ROLLAWAY MOTOR COMPANY, OF TOLEDO, OHIO, A CORPORATION OF OHIO.

VEHICLE-LAMP CONTROL.

Application filed December 29, 1923. Serial No. 683,284.

*To all whom it may concern:*

Be it known that I, EDWIN C. CROMPTON, a citizen of the Dominion of Canada, and a resident of Toledo, in the county of Lucas and State of Ohio, have made an invention appertaining to a Vehicle-Lamp Control, which invention is fully set forth in the following specification.

This invention relates to dirigible spot or headlights, and primarily to means for actuating and controlling the sidewise turning movements thereof relative to the vehicle when turned, so that the light turns with the steering wheel.

The object of the invention is the provision of a simple and inexpensive control and actuating means for lamps of the class described which is capable of being easily and quickly attached to the vehicle and is automatic in its operation.

The invention is fully described in the following specification, and while in its broader aspect it is capable of embodiment in numerous forms, one embodiment only thereof is illustrated in the accompanying drawings, in which, Fig. 1 is a top plan view of the front end portion of an automobile with the structure embodying the invention associated herewith. Fig. 2 is a front view thereof with portions of the vehicle broken away. Fig. 3 is an enlarged side elevation of a lamp and its carrying bracket. Fig. 4 is a section on the line 4—4 in Fig. 3. Fig. 5 is a top plan view of the lamp and its carrying bracket with a shifted position of the lamp shown in dotted lines. Fig. 6 is an enlarged section on the line 6—6 in Fig. 4, and Fig. 7 is an enlarged section on the line 7—7 in Fig. 4.

Referring to the drawings, 1 designates a vehicle, in the present instance of the Ford type, and 2 the front steering wheels thereof. The steering arms 3 of the steering wheel spindles are connected by the customary connecting rod 4, which is in turn connected near one end thereof by the steering rod 5 to the steering post arm 6 so that a turning of the arm 6 will impart a longitudinal movement to the connecting rod 4 and turning movement to the steering wheels 2.

The dirigible light 7, which for convenience will hereinafter be referred to as the "lamp" and in the mounting and control of which the invention resides, is provided at the rear of its shell with a centrally disposed rearwardly projecting stud 8 fitting, in the present instance, into a clamping socket 9 carried by the lower end portion of an L-shaped arm 10. This arm is fixed to and extends down from the short arm of a lever 11 which is mounted for free turning movements on a vertical spindle 12. The spindle 12 is fixedly clamped to and extends downward from a bracket arm 13 which is intended to be clamped to and project from some convenient part of the vehicle. When used in connection with a vehicle of the Ford type it is preferable to secure this bracket arm to the vehicle frame by one of the customary side bolts 14 thereof so that the arm projects from the forward end portion of the frame at one side of the radiator.

The lever 11 has a reduced sleeve 15 extending upward from its hub portion around the spindle 12 and this sleeve is loosely encircled by a spiral spring 16, one end of which is fixed to the lever as shown at 17, while its other end is fixed to a shouldered portion of the spindle as shown at 18. The spring is tensioned to impart a turning influence in one direction on the lever relative to the spindle. The spring is enclosed by a skirt 19 which is clamped to the arm 13 by the spindle shoulder. Nuts 20 are threaded on the lower end of the spindle to secure the lever in position thereon. The lever 11 projects crosswise of the lamp 7, in the present instance, away from the center of the associated vehicle, and a flexible cable or other suitable member 21 connects its outer end to a fixed point on the vehicle frame, the rear end of the cable being secured to a block 22, which is fixed in any suitable manner to the vehicle frame 23, preferably to the rear of the point of connection of the steering rod 5 with the steering arm 6. This cable acts against the tension of the spring 16 on the lever and limits the spring actuated turning movement of the lamp, which movement in the present instance is toward the center of the vehicle. This permissible movement of the lamp is determined by the maximum extent of turning movement in the same direction of the steering wheels 2 for the purpose hereinafter described.

A draft cable or member 24 of a flexible nature is fixedly secured at one end of the steering rod 25 of the vehicle, in the present instance, by a clamp 26 and has its other end provided with a loop or eye 27 through which the cable 21 loosely projects. The draft cable 24 is actuated by steering movements of the steering rod 5 to effect a pull on the cable 21 to turn the lamp against the tension of the spring 16 when the steering wheels are turned to the left, and to permit a slackening of the cable 21 and a turning of the lamp to the right under the influence of the spring 16 when the steering wheels are turned to the right.

In adjusting the lamp with respect to the steering movement of the wheels, the lamp, before the attaching of the cable 21 to the same is permitted to have the desired maximum throw to the right, or in the present instance towards the center of the vehicle, and the cable 21 is then connected to the lamp lever 11 and the frame 23 in taut relation whereby it acts to prevent a turning of the lamp to the right beyond the desired extent. The steering gear of a vehicle which should now be in substantially its extreme turning position to the right is connected by the cable 24 to the cable 21 with the cable 24 adapted to loosely slide on the cable 1 to freely adjust itself relative thereto and in substantially taut position but not effecting a bowing of the cable 21. When the steering gear is returned to its normal straight ahead position, the pull to the right which is thus effected on the draft cable 24 exerts a bowing stress on the cable 21 and causes a drawing of the lamp to proper position for straight ahead driving which position should be with the rays of the lamp directed a desired distance ahead of the car and to the right of the road. This position, however, may be changed as desired. When the steering gear is actuated to turn the steering wheels to the left, the pull thereby occasioned on the cable 24 exerts a further bowing action on the cable 21 causing a turning of the lamp in the direction of turning of the wheels an extent proportional to the turning of the wheels. It will be understood that while I have described one method of connecting up the lamp and adjusting it with respect to the movement of the steering gear, such adjustment may be accomplished in different ways without departing from the spirit of the invention.

It is evident that the draft member 24 may be connected to some other transversely movable part of the steering gear, as for instance to the connecting rod 4. It is found preferable, however, in practice, to connect it to the steering rod 5 inasmuch as this rod is elevated a greater extent than the rod 4.

I wish it understood that my invention is not limited to any specific construction, arrangement or form of the parts, as it is capable of embodiment in numerous forms without departing from the spirit of the claims.

Having thus described my invention, what I claim as new, and desire to secure by Letters Patent, is,—

1. In combination with a vehicle having steering arms rigidly inter-connected, a dirigible lamp mounted on the frame of the vehicle and having an arm projecting laterally therefrom, a flexible cable connected at one end to said arm and at the opposite end to the vehicle frame, spring means tending to hold said arm in position to maintain said cable taut, a draft cable connected at one end to said first cable intermediate the ends thereof and at the opposite end to the steering rod of the vehicle thereby automatically to control the position of the lamp by the steering mechanism.

2. In combination, a dirigible lamp having a centrally disposed, rearwardly projecting stud, a clamping socket to receive said stud, a substantially L-shaped arm fixed at one end to said socket for supporting the same, an actuating arm secured to the opposite end of said L-shaped arm and extending at substantially right angles therefrom, a vertically disposed spindle to which said actuating arm is pivoted intermediate its ends, a bracket arm secured to the upper end of said spindle for connecting the device to a part of a vehicle, a reduced sleeve on said actuating arm and surrounding said spindle, and a coil spring surrounding said sleeve and having its opposite ends fixed respectively to the actuating arm and to the spindle, thereby to hold said arm yieldingly in a predetermined position.

In testimony whereof I have hereunto subscribed my name to this specification.

EDWIN C. CROMPTON.